(12) United States Patent
Liik et al.

(10) Patent No.: US 9,344,461 B2
(45) Date of Patent: May 17, 2016

(54) SEAMLESS SESSION HANDOVER

(71) Applicant: Microsoft Technology Licensing, LLC, Redmond, WA (US)

(72) Inventors: Devid Liik, Tallinn (EE); Marcin Goliszewski, Tallinn (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 13/829,218

(22) Filed: Mar. 14, 2013

(65) Prior Publication Data
US 2014/0280705 A1    Sep. 18, 2014

(51) Int. Cl.
H04L 29/06    (2006.01)

(52) U.S. Cl.
CPC ........ *H04L 65/1069* (2013.01); *H04L 65/1083* (2013.01); *H04L 65/80* (2013.01)

(58) Field of Classification Search
CPC . H04L 65/1069; H04L 65/80; H04L 65/1083; H04L 29/06
See application file for complete search history.

(56) References Cited

U.S. PATENT DOCUMENTS

| | | | |
|---|---|---|---|
| 8,234,547 B2 | 7/2012 | Liu | |
| 8,312,134 B2 | 11/2012 | Kim | |
| 2003/0126246 A1* | 7/2003 | Blouin et al. | 709/223 |
| 2003/0232625 A1* | 12/2003 | Bhushan et al. | 455/509 |
| 2010/0074194 A1* | 3/2010 | Liu et al. | 370/329 |
| 2012/0051236 A1* | 3/2012 | Hegde | H04L 43/10 370/252 |
| 2012/0330701 A1* | 12/2012 | Hyder et al. | 705/7.11 |
| 2014/0012399 A1* | 1/2014 | Berkmann et al. | 700/28 |

FOREIGN PATENT DOCUMENTS

WO    WO-2005027557    3/2005

OTHER PUBLICATIONS

Behbahani, Peyman et al., "nSCTP: A New Transport Layer Tunnelling Approach to Provide Seamless Handover for Moving Network", *In Proceedings of the 9th International Conference on Mobile Wireless Communications Networks*, (Sep. 19, 2007), pp. 71-75.

Fu, Shaojian et al., "TraSH: A Transport Layer Seamless Handover for Mobile Networks", *In Technical Report: OU-TNRL-04-100*, (Jan. 2004), 7 pages.

Hong, Kangwoon "A Study on Improved Handover Technology with Virtual Interface Environment", *Advanced Communication Technology (ICACT), 2013 15th International Conference on*, (Jan. 2013), 6 pages.

(Continued)

*Primary Examiner* — Ebrahim Golabbakhsh
(74) *Attorney, Agent, or Firm* — Tom Wong; Micky Minhas

(57) ABSTRACT

Method, user device and computer program product communicating data between a first endpoint and a second endpoint. A plurality of logical communications channels are allocated between the first and second endpoint. In dependence of a trigger, a probe message is transmitted from the first endpoint to the second endpoint over each of the plurality of logical communications channels. The performance of each of the plurality of logical communications channels is determined in dependence on the transmission of probe messages. A first logical communications channel is selected in dependence on the performance determination. Data is streamed between the first and second endpoints over the first logical communications channel.

20 Claims, 5 Drawing Sheets

(56) References Cited

OTHER PUBLICATIONS

Ray, Sayan K., et al., "Handover in Mobile WiMAX Networks: The State of Art and Research Issues", *In IEEE Communications Surveys & Tutorials*, vol. 12, Issue 3, (2010), pp. 376-399.

Salsano, Stefano "Architecture and Testbed Implementation of Vertical Handovers Based on SIP Session Border Controllers", *In Journal of Wireless Personal Communications: An International*, vol. 43, Issue 3, (Mar. 31, 2007), pp. 1019-1034.

* cited by examiner

SEAMLESS SESSION HANDOVER

BACKGROUND

Some communication systems allow the user of a device, such as a personal computer or smart phone, to conduct voice or video calls over a packet-based computer network such as the Internet. Such communication systems include voice or video over internet protocol (VoIP) systems. These systems are beneficial to the user as they are often of significantly lower cost than conventional fixed line or mobile cellular networks. This may particularly be the case for long-distance communication. To use a VoIP system, the user installs and executes client software on their device. The client software sets up the VoIP connections as well as providing other functions such as registration and authentication. In addition to voice communication, the client may also set up connections for other communication media such as instant messaging ("IM"), SMS messaging, file transfer and voicemail.

Communications systems employing VoIP, or similar protocols are subject to many factors which may adversely affect call quality. For example, data packets may be lost (perhaps due to poor network conditions) when communication data is transmitted across the network, thereby affecting call quality.

User devices connected over a network may communicate data over logical communications channels which can be set up by client software on the devices. These logical channels may be affected by variable network conditions. Whenever the need to switch a logical communications channel is detected (e.g. if the logical communications channel is no longer operational or available), the user device switches to the next logical channel in a list of logical channels. However, if the next logical channel in the list is not operational or available, then this can lead to a disruption or termination in the data communication—particularly if there are no other available or operational logical channels in the list of logical channels. There is therefore a need to provide seamless and disruption-free streaming of data in variable network conditions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of communicating data between a first endpoint and a second endpoint. As part of the method of communicating data, a plurality of logical communications channels can be allocated between the first and second endpoint. In dependence of a trigger, a probe message may be transmitted from the first endpoint to the second endpoint over each of the plurality of logical communications channels. In dependence on the transmission of the probe messages, the performance of each of the plurality of logical communications channels can be determined. In dependence on the performance determination, a first logical communications channel can be selected. Data can then be streamed between the first and second endpoints over the first logical communications channel.

BRIEF DESCRIPTION OF THE DRAWINGS

For a better understanding of the present described embodiments and to show how the same may be put into effect, reference will now be made, by way of example, to the following drawings in which.

DETAILED DESCRIPTION

Figure 1:
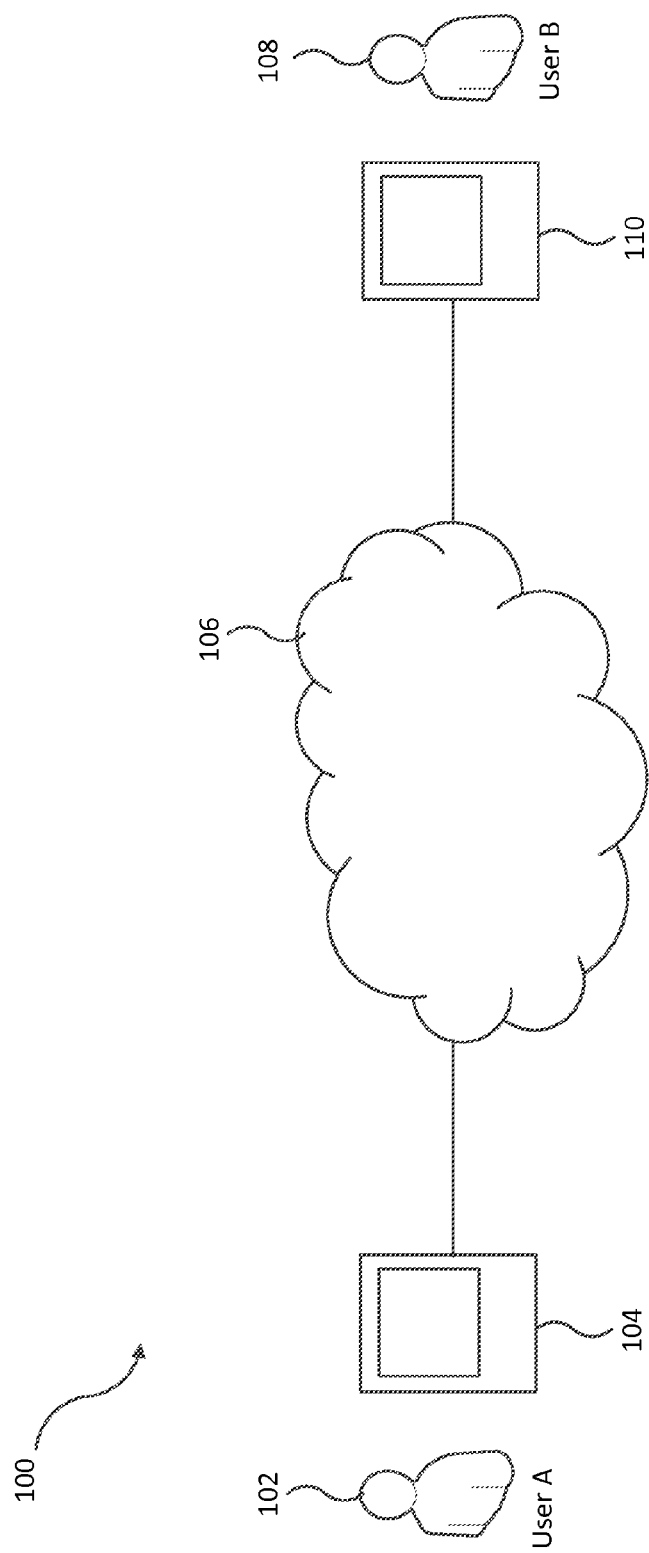
FIG. 1 shows a schematic illustration of a communication system.

FIG. 1 shows a communication system 100 comprising a first user 102 ("User A") who is associated with a first user device 104 and a second user 108 ("User B") who is associated with a second user device 110. In other embodiments the communication system 100 may comprise any number of users and associated user devices. The user devices 104 and 110 can communicate over the network 106 in the communication system 100, thereby allowing the users 102 and 108 to communicate with each other over the network 106. The communication system 100 shown in FIG. 1 is a packet-based communication system, but other types of communication system could be used. The network 106 may, for example, be the Internet. Each of the user devices 104 and 110 may be, for example, a mobile phone, a tablet, a laptop, a personal computer ("PC") (including, for example, Windows™, Mac OS™ and Linux™ PCs), a gaming device, a television, a personal digital assistant ("PDA") or other embedded device able to connect to the network 106. The user device 104 is arranged to receive information from and output information to the user 102 of the user device 104. The user device 104 comprises output means such as a display and speakers. The user device 104 also comprises input means such as a keypad, a touch-screen, a microphone for receiving audio signals and/or a camera for capturing images of a video signal. The user device 104 is connected to the network 106.

The user device 104 executes an instance of a communication client, provided by a software provider associated with the communication system 100. The communication client is a software program executed on a local processor in the user device 104. The client performs the processing required at the user device 104 in order for the user device 104 to transmit and receive data over the communication system 100.

The user device 110 corresponds to the user device 104 and executes, on a local processor, a communication client which corresponds to the communication client executed at the user device 104. The client at the user device 110 performs the processing required to allow the user 108 to communicate over the network 106 in the same way that the client at the user device 104 performs the processing required to allow the user 102 to communicate over the network 106. The user devices 104 and 110 are endpoints in the communication system 100. FIG. 1 shows only two users (102 and 108) and two user devices (104 and 110) for clarity, but many more users and user devices may be included in the communication system 100, and may communicate over the communication system 100 using respective communication clients executed on the respective user devices.

Figure 2:
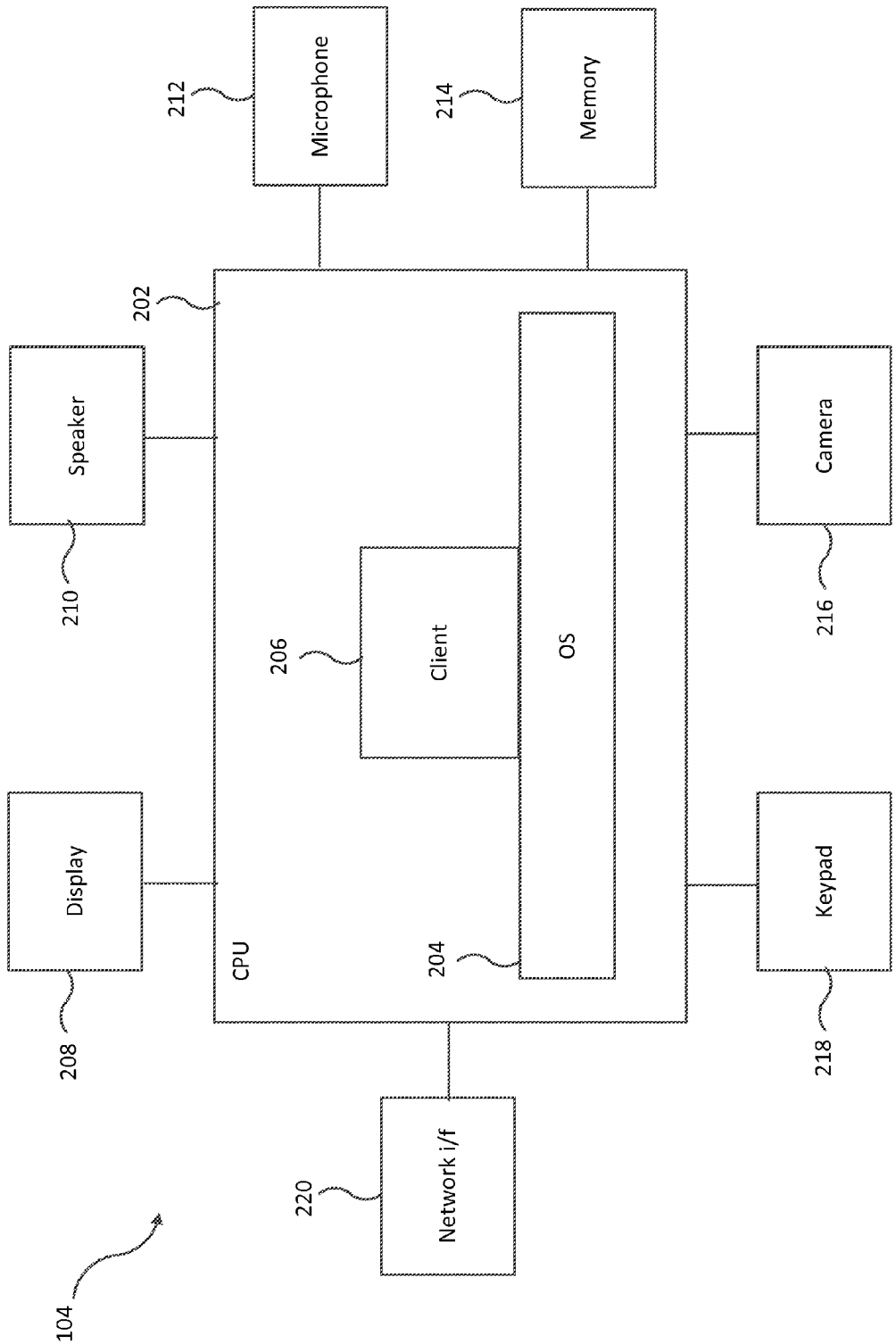
FIG. 2 is a schematic block diagram of a user device.

FIG. 2 illustrates a detailed view of the user device 104 on which is executed a communication client instance 206 for communicating over the communication system 100. The user device 104 comprises a central processing unit ("CPU") or "processing module" 202, to which is connected: output devices such as a display 208, which may be implemented as a touch-screen, and a speaker (or "loudspeaker") 210 for outputting audio signals; input devices such as a microphone 212 for receiving audio signals, a camera 216 for receiving image data, and a keypad 218; a memory 214 for storing data; and a network interface 220 such as a modem for communication with the network 106. The user device 104 may comprise other elements than those shown in FIG. 2. The display 208, speaker 210, microphone 212, memory 214, camera 216, keypad 218 and network interface 220 may be integrated into the user device 104 as shown in FIG. 2. In alternative user devices one or more of the display 208, speaker 210, microphone 212, memory 214, camera 216, keypad 218 and network interface 220 may not be integrated into the user device 104 and may be connected to the CPU 202 via respective interfaces. One example of such an interface is a USB interface. If the connection of the user device 104 to the network 106 via the network interface 220 is a wireless connection then the network interface 220 may include an antenna for wirelessly transmitting signals to the network 106 and wirelessly receiving signals from the network 106.

FIG. 2 also illustrates an operating system ("OS") 204 executed on the CPU 202. Running on top of the OS 204 is the software of the client instance 206 of the communication system 100. The operating system 204 manages the hardware resources of the computer and handles data being transmitted to and from the network 106 via the network interface 220. The client 206 communicates with the operating system 204 and manages the connections over the communication system. The client 206 has a client user interface which is used to present information to the user 102 and to receive information from the user 104. In this way, the client 206 performs the processing required to allow the user 102 to communicate over the communication system 100.

The communication client instance 206 on each user device can establish logical communication channels for communicating data. The data communicated over the logical channels may be, for example, a data stream for streaming media such as audio and/or video, messages such as instant messages and/or files such as documents or photos.

One or more logical channels can be established between the user devices by, for example, exchanging channel establishment messages. Such messages can be exchanged either directly over the logical channel being established (e.g. if the channel is being established over TCP, a connection between two endpoints is made and then a message identifying a communication context (also called a session) is sent over that connection) or via a different logical channel established previously (e.g. during a session, a message can be sent via a first channel indicating that the other endpoint can expect a second channel to be used for communication within the session). Logical channel establishment may also involve setting up more than two endpoints—in a case of a relayed communication path, at least one relaying node (i.e. a relaying or intermediate "endpont") can be set up to be able to relay the traffic between the endpoints.

The logical communications channels can be established by the communication client instance over different underlying protocols (e.g. UDP, TCP, etc) over different network communication types (e.g. Ethernet, WiFi, 3G, LTE, etc). The communication client instance can establish and maintain more than one logical communications channel between the endpoints. A plurality of logical communications channels are capable of being maintained over a single physical communications channel (for example, over a single WiFi channel). Each of the plurality of logical communications channels are capable of being maintained over different link layer communications protocols. For example, if a user device is able to connect to the network via WiFi and 3G, a particular logical communications channel can be established and maintained over the WiFi connection or the 3G connection. The user devices can maintain multiple logical communications channels between them such that data is capable of being communicated over multiple logical communications channels at the same time. For example, one of the logical communications channels can be used to stream data and, at the same time, one or more other logical communications channels can be used send probe message data.

Figure 3:
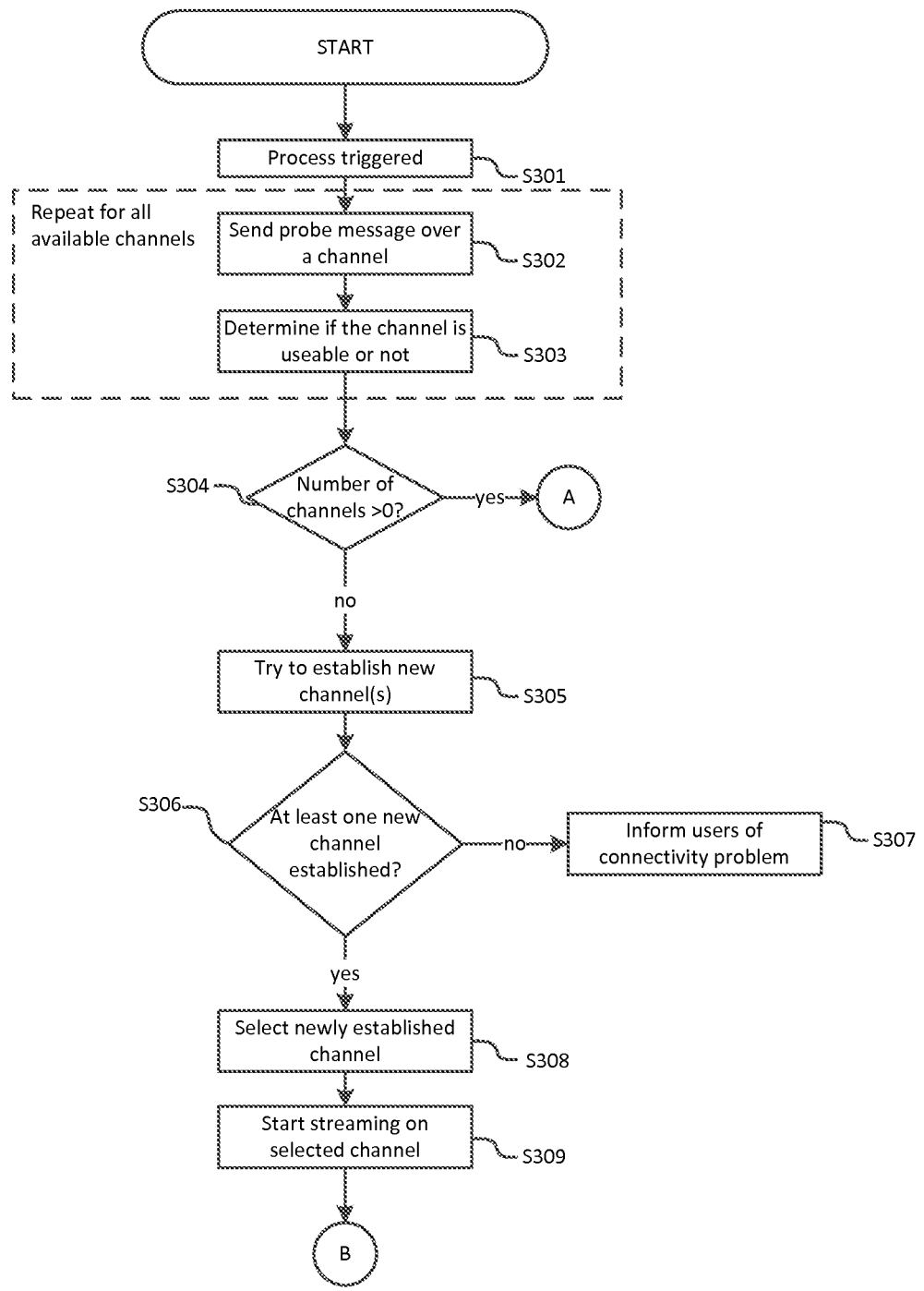
FIGS. 3-3c are flow charts for processes of selecting a channel for streaming data.

FIG. 3 is a flow chart for the process of selecting a new logical communications channel (hereinafter referred to as a "channel") for streaming data between a first user device and a second user device. The process may start during the initialisation of communications between the first and second devices. For example, during the initial setup of communications between the first and second device, a set of channels may initially be allocated. The process may commence after initial channel allocation. Additionally or alternatively, the process may commence at a point during or after streaming of data over the allocated channels.

In step S301, the process begins in response to a trigger. The trigger may be, for example, a signal that indicates the end of the initial channel allocation during initial set up of communications between the first and second devices. As discussed in further detail below, the trigger may be in response to detecting a change or potential change in the communications network and/or in response to a time-out.

In step S302, a probe message is sent from the first device to the second device over an allocated channel. If the second device receives the probe message, it responds with an acknowledgement. The probe message may be an echo request packet and the acknowledgement may be an echo reply.

In step S303, the first device determines if the channel is usable. If an acknowledgement is received before a predetermined time period from sending the probe message, then this can indicate that the performance of the channel may be adequate and so the channel is determined or classified as being usable or operational. If an acknowledgement is not received before a predetermined time period from sending the probe message, then this can indicate that the performance of the channel may be inadequate and so the channel is determined or classified as being not usable or not operational. Steps S302 and S303 are then repeated for all other allocated channels established between the first and second devices. Thus, the performance of each of the allocated channels can be determined by either receiving a response or not receiving a response to the respective transmitted probe messages.

In step S304, the first device determines if there are any channels classified as being usable. If one or more channels are classified as being usable, the process moves on to process A shown in FIG. 3a or, in another embodiment, process A shown in FIG. 3b. If there are no channels classified as usable (because all available channels are classified as not usable or there are no available channels), the process moves on to step S305.

In step S305, the first device attempts to establish one or more new channels. In step S306, it is determined if there is at least one new channel established. If at least one new channel is not established, then the process moves on to step S307, where the user of the device is informed of connectivity problems. If at least one new channel is established, then the process moves to step S308, where the newly established channel is selected. In step S309, the first device streams data to the second device over the selected channel.

Figure 3A:
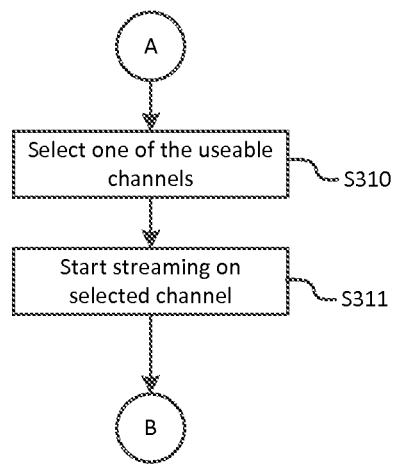

In the embodiment shown in FIG. 3a, in step S310, one of the channels classified as being usable is selected for streaming data. In step S311, the first device streams data to the second device over the selected channel.

Figure 3B:
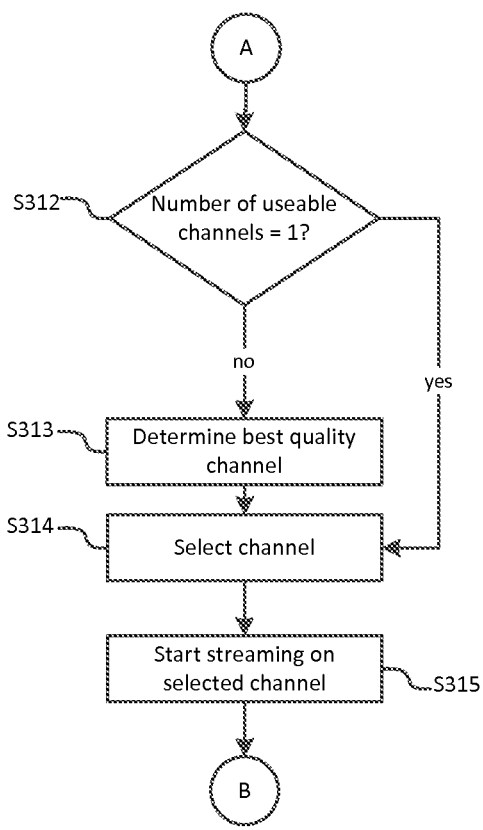

In another embodiment shown in FIG. 3b, in step S312, the number of channels classified as usable is determined. If there is one usable channel, that channel is selected in step S314 and the process moves on to step S315. If there is more than one usable channel, the process moves on to step S313. In step S313, the best quality or best performing channel is determined. The best channel can be determined from quality or performance measurements for each channel performed at this step or during the channel testing in steps S302 and S303. The best channel is then selected at step S314. The selected channel is then used for streaming data between the first and second devices in step S315.

Figure 3C:
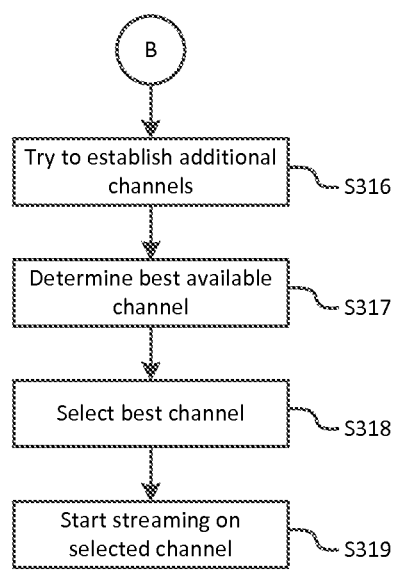

In another embodiment, after steps S309, S311 or S315, the process can move on to process B, as depicted in FIG. 3c. In step S316, the first device attempts to establish new channels and/or re-establish channels that were classified as not operational in step S303.

The process then moves on to step S317, where the best available channel is determined. The best channel can be determined from quality or performance measurements for each channel that are performed at this step. Alternatively, the quality or performance measurements are carried out at this step for only the newly established or re-established channels and for the channels that were classified as operational, performance measurements carried out during the channel testing in steps S302 and S303 or in step S313 can be used to determine the best available channel.

The best channel is then selected at step S318 and the data streaming is switched or handed over to the newly selected channel at step S319. The streaming data may be a continuation of a data steam that was previously being streamed over a different channel other then the selected channel (i.e. prior to selecting a channel in steps S309, S311, S315 or S319, a data stream for a session may have been streaming on a different channel). Alternatively, the selected channel may be the same as the channel that the data stream was being streamed on in the session as that channel continues to have an adequate performance or the best performance at the time of channel testing.

As mentioned above in relation to step S301 of FIG. 3, the process of testing the channels may be triggered in response to detecting a change or potential change in the communications network. For example, a change in the condition of the communications network could be indicated by a change in the available network interfaces for the device. For example, the device may be a smart phone that is communicating with the second device over the allocated channels using a 3G connection. If the smart phone then moves into a WiFi zone, thus enabling its WiFi interface, and detects a WiFi access point that it is able to connect to, then the smart phone could begin communicating data over the WiFi connection instead of the 3G connection. This change to a WiFi connection can trigger the process of testing the allocated channels (or any potential channels that could be allocated) so that the smart phone is able to determine the quality of the logical channels using the WiFi connection. As described in the process above, the best performing available logical channel can then be selected for streaming.

Other detectable changes or potential changes in the communications network that could trigger the channel testing process described above could be, for example: a change in address assigned to a network interface; an interruption in communications over the communications network; a change in bandwidth; a change in latency or a change in a mode of operation of a network interface (e.g. changing from GPRS mode to EDGE mode for a smart phone or a change in WiFi mode).

The channel testing process could also be triggered by a measure of the quality of a data stream. For example, a data stream over an allocated channel between user devices may decrease in quality (which may be measured by, for example, streaming bit rate, etc) to below an acceptable threshold. If the stream falls below this threshold, the channel testing process can be triggered to enable the streaming channel to be switched to a new, higher quality channel.

The process of channel testing can also be carried out periodically. The channel testing could be triggered after the expiration of a specified amount of time (i.e. a time-out) which is restarted at the end of each time-out and/or on selecting a new channel. The periodicity of the channel testing (i.e. the amount of time between each channel test) can be fixed or variable. For example, the device might detect that the network connection is poor or changeable and thus the intervals between testing could be reduced so that the best channel is more likely to be used.

The logical channel testing process can also be used to determine and select the best performing network connection type. For example, in the smart phone example mentioned above, the performance of the logical channels over 3G and WiFi can be determined. Based on the performance of the logical channels over each network type, the communication client instance on the smart phone can select the network type (3G or WiFi) that provides the best performance for communicating data over the logical channels.

As mentioned above in relation to steps S313 and S317, the quality of the channels can be determined. This can be achieved by measuring, for example, the packet drop rate, the retransmission rate, round-trip times, jitter, etc on each of the operational channels. For example, during steps S302 and S303, the round-trip times determined from an echo request and received echo reply message can be measured and stored to determine the performance of each channel. At step S313 or S317, the round trip times can be used to determine the best performing channel (e.g. the channel with the shortest round-trip time). The quality of the channels can be determined from one or a combination of different measurements.

The channel testing process described above allows channels used by the transport layer to be changed while being able to provide a continued stream flow in a manner that is seamless for the users. The above mentioned channel testing results enables the selection of an operational, high-quality channel with a high probability of success. As described in relation to step S316, the selection of a new channel can be combined with an attempt to re-establish all the possible channels which are not available at that given moment so that whenever a channel able to provide improved quality of service is established it can be used for further streaming.

As described in relation to steps S305-S309, whenever no operational channels are detected, the seamless experience can still be maintained by trying to establish a new channel without the need to notify the user and thus significantly improve the overall user experience.

The functions described herein can provide an operational logical network connection (or session) able to successfully transfer data which can seamlessly switch logical channels in a manner not visible to the users. Thus the users can have an 'always working' session in variable network conditions (e.g. when switching network interfaces by the OS, temporary network outages, etc).

Generally, any of the functions described herein (e.g. the functional steps shown in FIGS. 3-3c) can be implemented using software (e.g. as an application transport layer algorithm), firmware, hardware (e.g., fixed logic circuitry), or a combination of these implementations. The steps shown in FIGS. 3-3c may or may not be implemented as separate steps. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors.

For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of communicating data between a communication client at a first endpoint and a communication client at a second endpoint, the method comprising:
    allocating a plurality of logical communications channels between the first and second endpoint;
    detecting a change or potential change in a communications network for communicating data between the first and second endpoints;
    in response to the detecting, transmitting a probe message from the communication client of the first endpoint to the second endpoint over each of the plurality of logical communications channels;
    measuring, by the first communication client, the performance of each of the plurality of logical communications channels in dependence on said transmission of probe messages, said measuring the performance comprising at least measuring a jitter of each of the plurality of logical communications channels;
    selecting, in dependence on said performance measurement, a first logical communications channel from the plurality of logical communications channels; and
    streaming data between the first and second endpoints over the first logical communications channel.

2. The method of claim 1, the first endpoint being a first device executing the communication client application and the second endpoint being a second device executing a corresponding communication client application.

3. The method of claim 1, the plurality of logical communications channels capable of being maintained over a single physical communications channel.

4. The method of claim 1, said streaming data being a continuation of a data steam over a logical communications channel other than the first logical communications channel.

5. The method of claim 1, said measuring of the performance of each of the plurality of logical communications channels being further dependent on a response or non-response for each of the said transmitted probe messages.

6. The method of claim 5, wherein each response to the transmitted probe message indicates the performance of the logical communications channel over which said probe message was transmitted.

7. The method of claim 1, said measuring of the performance of each of the plurality of logical communications channels further comprising measuring: a packet drop rate, a retransmission rate, or a round-trip time.

8. The method of claim 1, wherein the detecting the change or potential change in the communications network for communicating data between the first and second endpoints, comprises generating a trigger that is effective to initiate the transmitting.

9. The method of claim 1, said change or potential change in the communications network comprising a change or potential change in the physical network connection.

10. The method of claim 1, said change in the communication network comprising one or more of: a change in available network interfaces; a change in address of a network interface; an interruption in communications over the communications network; a change in bandwidth; a change in latency or a change in a mode of operation of a network interface.

11. The method of claim 1, said potential change in the communications network comprising a change in a list of available network interfaces.

12. The method of claim 1, further comprising establishing one or more additional logical communications channels subsequent to selecting the first logical communications channel.

13. The method of claim 1, further comprising: classifying each of the plurality of communications channels as usable or not usable, said classifying being dependent on said measuring of performance.

14. The method of claim 13, said selecting being further dependent on said classifying.

15. The method of claim 14, if more than one logical communications channel is classified as usable, the logical communications channel having the best performance and classified as usable being selected.

16. The method of claim 13, further comprising attempting to establish one or more additional logical communications channels if each of the plurality of communications channels are classified as not usable.

17. A system configured to communicate data, the system comprising:
    one or more processors; and
    a computer-readable storage medium comprising instructions of a communication client, executable by the one or more processors to configure the system to perform operations comprising:
        allocating a plurality of logical communications channels between a first and second endpoint;
        detecting a change or potential change in a communications network for communicating data between the first and second endpoints;

in response to the detecting, transmitting a probe message from the communication client of the first endpoint to the second endpoint over each of the plurality of logical communications channels;

measuring, by the first communication client, the performance of each of the plurality of logical communications channels in dependence on said transmission of probe messages, said measuring the performance comprising at least measuring a jitter of each of the plurality of logical communications channels;

selecting, in dependence on said performance measurement, a first logical communications channel from the plurality of logical communications channels; and streaming data between the first and second endpoints over the first logical communications channel.

18. A first endpoint device configured to execute a communication client to communicate data, the communication client comprising:

a channel allocation module configured to allocate a plurality of logical communications channels between the device and a second endpoint;

a channel testing module configured to:

detect a change or potential change in a communications network for communicating data between the first and second endpoints;

in response to the detection, transmit a probe message to the second endpoint over each of the plurality of logical communications channels; and measure the performance of each of the plurality of logical communications channels in dependence on said transmission of probe messages, the measurement of the performance comprising at least a measurement of a jitter of each of the plurality of logical communications channels;

a channel selecting module configured to select, in dependence on said performance measurement, a first logical communications channel from the plurality of logical communications channels; and a data communications module configured to stream data between the device and the second endpoint over the first logical communications channel.

19. The device of claim 18, wherein the detection of the change or potential change in the communications network for communicating data between the first and second endpoints, comprises generating a trigger that is effective to initiate the transmission.

20. The device of claim 18, said change or potential change in the communications network comprising a change or potential change in the physical network connection.

* * * * *